United States Patent [19]

Weisgerber

[11] Patent Number: 5,096,286
[45] Date of Patent: Mar. 17, 1992

[54] METHOD FOR TRANSITIONING BETWEEN TWO DIFFERENT FRAME RATES DURING A SHOWING OF A SINGLE MOTION PICTURE FILM

[76] Inventor: Robert C. Weisgerber, 246 E. 93rd St., New York, N.Y. 10128

[21] Appl. No.: 489,962

[22] Filed: Mar. 7, 1990

[51] Int. Cl.$^5$ .............................................. G03B 21/32
[52] U.S. Cl. ..................... 352/40; 352/180; 352/167; 352/121; 352/91 R
[58] Field of Search ............... 352/91 R, 91 C, 91 S, 352/121, 167, 180, 40

[56] References Cited

U.S. PATENT DOCUMENTS

| | | | |
|---|---|---|---|
| 3,419,325 | 12/1968 | Mayr et al. | 352/91 S |
| 3,741,636 | 6/1973 | Nakayama | 352/180 |
| 3,788,736 | 1/1974 | Oulevay et al. | 352/180 |
| 3,825,329 | 7/1974 | Heinrich et al. | 352/180 |
| 4,052,126 | 10/1977 | Freudenschuss et al. | 352/180 |
| 4,141,630 | 2/1979 | Emmons | 352/121 |

*Primary Examiner*—Monroe H. Hayes
*Attorney, Agent, or Firm*—David Peter Alan

[57] ABSTRACT

A method is disclosed whereby a motion picture projector is equipped to operate at two or more different speeds, such as 24 and 30 frames per second. It is envisioned that different parts of a motion picture may be recorded at different frame rates, to variably impart a highly intense effect upon the audience, expanding the parameters of creative control for the producer of the film. In operation, the method described facilitates switching between these different frame rates, both during the presentation of a single motion picture and between pictures. Cue signals recorded onto the film actuate the change in speed. The projector is automatically set to switch operation into a different speed, and the frames of the film that will be shown during the transitional period are prepared to give the audience the impression of a smooth transition between speeds. Alternate frames to be shown during this transitional period are underexposed, the degree of underexposure increasing or decreasing linearly until the new speed is attained. The illusion of flicker is thus created during transition, so that the audience will perceive flicker as disappearing suddenly at the higher speed, or appearing suddenly as soon as deceleration begins. Audio information is digitally processed to be played back at the marginal speed of each specific frame as it is projected. The system described can be combined with other elements of a high-impact picture-dominance system, such as a high level of screen brightness and the expansion of a film image to provide a highly realistic experience.

19 Claims, 1 Drawing Sheet

METHOD FOR TRANSITIONING BETWEEN TWO DIFFERENT FRAME RATES DURING A SHOWING OF A SINGLE MOTION PICTURE FILM

BACKGROUND OF THE INVENTION

This is a co-pending application, related to Weisgerber, *Motion Picture Production and Exhibition System,* application Ser. No. 07/228,495, filed Aug. 7, 1988. The parent application discloses a multicomponent system for variably producing a high-impact, picture-dominance effect on motion picture audiences in a manner compatible with existing motion picture photographic and projection equipment and in a configuration that can be installed in a conventional motion picture theater. The system disclosed in the parent application also produces the picture-dominance effect in a manner that permits switching the effect in or out of the system, alternating between conventional and high-impact experience as an aid to advancing the story line of the motion picture.

As part of the overall picture dominance system, it is necessary to change film speeds during the film presentation. This is a part of the selective introduction of the high-impact effect, which is modulated during a single film presentation to expand the creative control of the filmmaker by engrossing the audience in a high-intensity experience during parts of the film and withdrawing into conventional film experience when the high-impact mode is not required. In addition to a transition from 24 to 30 fps, there are other events accompanying the transition; an increase in screen brightness and the expansion of viewing area by moving the four masks that surround the screen to expose more viewing area.

The system disclosed in the parent application is not the only application departing from the conventional frame rate of 24 fps. The rate of 24 fps became standardized during the early history of film when the early rate of 16 fps (projected with a triple-bladed shutter) gave way to the new speed of 24 fps, shown with a double-bladed shutter. The standard of 48 impressions per second was maintained, and the frame rate of 24 fps has remained the standard within the industry, to this day.

It now appears that a new frame rate of 30 frames per second will soon gain ground within the industry. There were early experiments with the 30 fps rate; *Oklahoma* and *Around the World in Eighty Days* were shot in both 24 and 30 fps versions. The 30 fps rate has other advantages, as well. It is compatible with the NTSC television standard of 30 frames (60 fields) per second, roughly comparable to a film shown at 30 fps with a double-bladed shutter. The 30 fps rate also has significant advantages for viewers in the audience. Film grain and flicker are reduced, and the 30 fps rate provides smoother interpolation of motion, since the increments of motion as actually photographed are closer together in time. The reduced flicker also allows increased screen brightness, up to 25 foot-lamberts. As disclosed in the parent application, the rate of 30 frames per second has significant advantages over the conventional rate of 24 fps. These advantages have been officially recognized. See Di Gioia: *Final Committee Report on the Feasibility of Motion Picture Frame Rate Modification to 30 Frames/Sec., SMPTE J.,* May, 1988 at 404.

There have been other efforts to introduce new frame rates. The SHOWSCAN system (Trumbull, U.S. Pat. Nos. 4,477,160 and 4,560,260) teaches a conventional 70 mm format, projected at frame rates in excess of 50 fps, preferably 60 fps. This high rate has the advantage of delivering an extremely smooth picture presentation, but it is not compatible with conventional equipment, which cannot operate without undue wear and tear on both projector and film, due to high speeds of projector operation and film travel. The 30 fps speed still gives the viewer 60 impressions per second without the drawbacks of SHOWSCAN.

With the likely appearance of 30 fps as a new standard projector frame rate, it will be necessary for exhibitors to switch between 24 fps and 30 fps operation within the course of an evening's film program, if not between scenes or sequences within a single film. It should be noted that, while the description of the current invention will refer to the 24 and 30 fps frame rates, other frame rates can be substituted and the principle disclosed will remain the same. An objective of the present invention is to provide a means for transition between frame rates, within the context of a single motion picture, encompassing an operation (or set of operations) that are completely automated. It is a further objective of this invention to provide a means for interpolating films of both speeds into a film program, without going through the steps required to change speeds manually.

The overriding objective of the invention is to create an experience for the viewers of the films shown that will not distract the viewers with artifacts that "remind" them that the film speed is being changed. The present system is designed to minimize wow and flutter, artifacts that often accompany a speed change. The system was designed as part of an overall system for exhibiting films in which a high-impact experience (picture dominance) is presented to the audience for certain portions of a motion picture and withdrawn, for a return to conventional film experience, at other times. In other situations, however, it will be necessary to change frame rates. A trailer for a film recorded in the high-impact system can be incorporated into a "conventional" 24 fps program. Films shot at 30 fps can be shown immediately before or after films shot at 24 fps. The storage of an entire evening's program on one platter and automatic transition between film speeds will simplify motion picture theater operations, while delivering an improved experience to the audience.

BRIEF DESCRIPTION OF THE INVENTION

This invention concerns the treatment of specific, small portions of motion picture film, located at critical places within a motion picture or between separate pictures. All films currently known and many of the films that will be produced in the future are projected at a constant rate of 24 frames per second. Other films were, or will be recorded to be shown at a constant rate of 30 fps. The invention described here does not pertain to such portions of films. It does concern a means for switching between frame rates between films, or between scenes within a single film.

In order to provide control for the speed change function, cue signals recorded onto the film activate the functions that will be described. These control signals are applied to the film in any conventional manner, such as tabbing, coding or use of tones or pulses. These signals can be on a separate track or multiplexed with the audio portion of the film. They can be analog (tones or pulses) or digital (bursts of data) for compatibility with the recording system used for the audio portion of the motion picture. For transitioning between films, control signals can be recorded onto leader and the leader inserted into the film continuity.

In order to accomplish the smooth speed transition that is the objective of this invention, the frames of film that are projected during the transitional period are treated separately.

In the preferred embodiment of this invention, the projectors used for showing motion pictures are standard 35/70 mm projectors, with standard Geneva movements. The emerging electronic projectors can also be used. In the case of a conventional projector, the change in frame rate is accomplished by inserting a switchable solid state power supply to generate current for the AC synchronous motor that operates the projector. Conventional 60 Hz. AC currents is provided for 24 fps operation. For 30 fps operation, a synthesized 75 Hz. AC current is provided. When the speed is to be increased, the frequency synthesizer will be prepared to increase the reference frequency from 60 Hz. to 75 Hz. over a specified period of time and at a specific rate of frequency change. The reverse process is activated to decrease frame rate from 30 to 24 fps.

For the primary application of the invention, it is desired to retain flicker during the transitional period (while speed is changing) and to eliminate it quickly upon attainment of the 30 fps rate. To achieve this objective, alternate frames are underexposed, with the amount of underexposure increasing, until film speed becomes 30 fps, at which time such speed is maintained and flicker essentially eliminated. The audience will perceive that the flicker suddenly disappears. With the increase of screen brightness feasible at 30 fps, grain is randomized and strobescopic effects reduced, all contributing to audience perception of a highly realistic image.

During acceleration, audio information recorded onto the film is presented on a frame-by-frame basis, at the rate of speed at which that particular frame is projected. Correction of this sort can be accomplished for audio recorded in the digital mode by methods known in the art. Audio information recorded in the analog mode must be converted to digital, treated as above, and converted back to analog. This treatment eliminates the changes in pitch that accompany sound when the reproducing equipment either speeds up or slows down. The process for acceleration is reversed during deceleration.

The invention can be combined with other events that accompany speed changes. Screen brightness can be increased at 30 fps, as described. In the variable picture dominance mode, any or all of the four masks that surround the screen will also be moved during the transition.

DETAILED DESCRIPTION OF THE INVENTION

As described previously, a motion picture audience perceives a much more realistic experience viewing a picture projected at 30 fps with a high screen brightness (20 to 25 foot lamberts) than while viewing a "conventional" picture projected at 24 fps with screen brightness of about 10 foot lamberts. It is imperative that the audience not perceive that the speed is changing, however, during a picture. The intense impact of the brightly-lit image projected at the higher speed must suddenly "hit" the audience.

The events described here pertain to the introduction of the high-impact mode into a motion picture. For the transition from high-impact mode to conventional mode, the events are reversed.

This invention only affects small portions of the motion picture; those portions intended to be shown during the transition from one speed to the other. It is envisioned that the transition will take the amount of time necessary to project sixty frames. This amount to between two and two and one half seconds. The preferred embodiment of this invention requires special preparation of sixty frames of film for each transition, although it is possible to accommodate a transition of shorter or longer duration.

It is assumed that the acceleration of the film during the transition process is constant (speed of film travel increasing at a constant rate), due to the flywheel effect of the take-up reel or apparatus on the projector. If the acceleration actually varies from linearity, the error would be sufficiently small as to be imperceptible. In accordance with this assumption, artifacts which accompany. In accordance with this assumption, artifacts which accompany accelerations (wow and flutter for audio, jitter and uneven strobescopic effects for video) should remain below perceptible levels.

At the 30 fps speed, strobescopic effects are greatly reduced and interpolation of motion appears significantly smoother. A linear speed change (constant acceleration) is assumed; any effects of deviations from this linearity are imperceptible. The gradual randomization of film grain during the transition is acceptable. The full benefit of photography and projection at 30 fps is then presented to the audience, as soon as the transition is completed.

BRIEF DESCRIPTION OF THE DRAWINGS

FIG. 1 shows the interrelationship between the events that comprise the process covered by the invention. In the preferred embodiment, control information recorded on the film being shown activates a change from 60 Hz. to 75 Hz. AC for the transition from 24 fps to 30 fps frame rate. When the 30 fps rate has been attained, voltage to the projector lamp is also increased, thereby increasing the brightness of the picture projected onto the screen. Other signals recorded onto the film can activate a separate system that moves the masks that surround the screen. For the transition from 30 fps to 24 fps, the process is reversed.

The one artifact that must suddenly disappear is flicker. To create this sudden disappearance, it is necessary to artificially create the illusion of flicker during the transition from 24 to 30 fps. Flicker is caused by the opening and closing of the projector shutter 48 times per second, a rate that appears unrealistically slow to human visual perception. During transition, the impression of flicker is produced to "fool" the audience into perceiving the experience of 48 impressions per second, until the rate of 60 impressions per second is attained. Varying the exposure level of certain transitional frames maintains the illusion of flicker until the speed is up to 30 fps, at which time light brightness is suddenly increased to 20 foot lamberts or more. The apparent suddenness of the transition creates the desired impact on the audience, especially in scenes of high luminosity (presence of large amounts of white).

Figure 1:
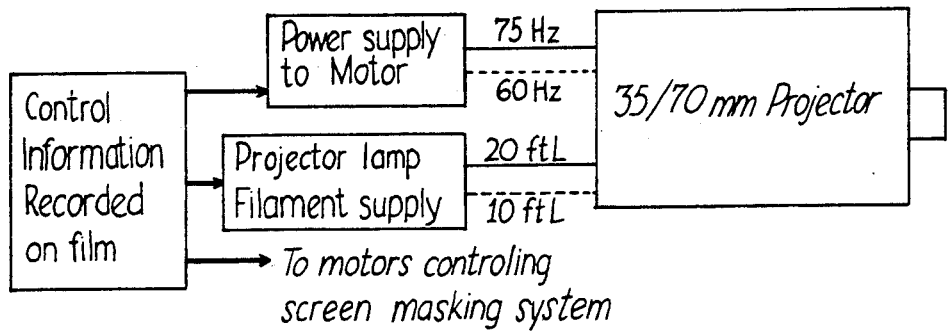
FIG. 1 is a block diagram of the overall system configuration.
Figure 2:
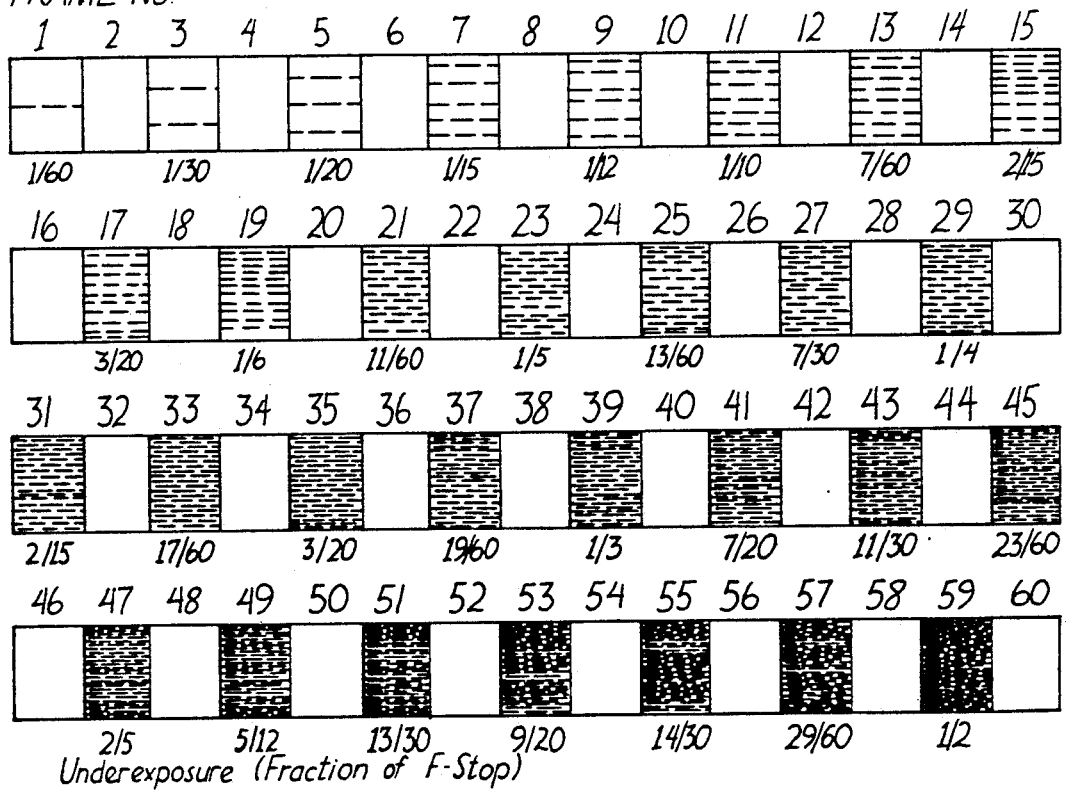
FIG. 2 shows a stylized strip of film as treated in the preferred embodiment of the invention, depicting selectively increasing underexposure of selected frames during the transition from a frame rate of 24 fps to a frame rate of 30 fps.

FIG. 2 shows the progressive increase in the amount of underexposure of selected frames when changing from 24 fps (conventional) model to 30 fps (high-impact) mode. The drawing represents the change in exposure levels during the transitional portion of the film and does not depict the audio and control information that are also contained in the film.

If the frames contained in the transitional portion of the film are numbered from 1 to 60 for reference purposes, exposure levels on some of these frames must be altered. To maintain the illusion of flicker, every other frame is underexposed during transition. For reference, the odd-numbered frames will be underexposed, while the even-numbered frames will be exposed normally. The difference in exposure levels must increase gradually, until maximized at Frame 59 of the transition. At Frame 60, the projector has reached the speed of 30 fps and the projector lamp is switched to the high-intensity brightness level. The screen masks have also opened during transition to reveal more viewing area. In the preferred embodiment of this invention, Frame 59 will be underexposed by one half of one f-stop. For the gradual effect, exposure of alternate frames is decreased each time by one 1/60 of an f-stop. For example, Frame 1 will be underexposed by 1/60 of an f-stop, Frame 3 by 1/30 (2/60) of an f-stop, this pattern continuing until Frame 59 is underexposed by one half of an f-stop. All even-numbered frames will be exposed normally. With full exposure at Frame 60 (and beyond), at the 30 fps speed; it will appear to the viewer that the flicker has suddenly disappeared, as the image on the screen becomes much brighter.

In the reverse direction (from 30 to 24 fps), it is desired that flicker return immediately and be artificially produced during the deceleration process. The brightness of the projector lamp is lowered to conventional level immediately at Frame 1, which is underexposed by one half of one f-stop. The amount of underexposure decreases by 1/60 of an f-stop with each alternate frame (even numbered frames are again fully exposed) until Frame 59 is only underexposed by 1/60 of an f-stop and Frame 60 is fully exposed and projected at 24 fps. By the time Frame 60 is projected, the screen masks have closed to accommodate the picture, which is now conventional size.

The constant (or near-constant) acceleration in the speed change process permits a smooth transition, with wow and flutter held to imperceptible levels in the audio portion of the film. Still, it is necessary to conceal the changes in pitch caused by the change in speed of audio reproduction. Audio is processed digitally on a frame-by-frame basis during the 60 transitional frames. This can be done on postproduction mixing or during projection. A machine such as the Lexicon Audio Pitch Changer, Model 1200B can be used for this application. In the case of analog audio, the audio must be converted to digital, speed-corrected for each transitional frame and reconverted to analog.

The preferred embodiment of the invention relates to a system for producing a highly-realistic picture-dominance illusion for motion picture audiences and either introducing or withdrawing the picture-dominance mode at the discretion of the producer of the film, so it becomes one of the tools with which filmmakers can work to enhance and expand the film experience. The invention is a component of such a system, a precise method for efficiently and appropriately handling the transition between film speeds and other parameters that accompany the change in film speed.

Other applications are possible. Leader prepared with the appropriate control information can accomplish a speed transition between films, so that an entire program, consisting of both 24 fps and 30 fps films, can be stored on a single platter. Nonstandard speeds (e.g. 90 Hz. AC for 36 fps projection) can be accommodated, and there is no reason why three or more speeds cannot be delivered and selected. Even speeds in the SHOW-SCAN range (50 to 72 fps, generally 60 fps) can be accommodated, if the projector is capable of handling such high frame rates. The preferred embodiment of selecting between 24 and 30 fps was chosen because of the prevalence of 24 fps, the likelihood that 30 fps will soon reach widespread use, and the demonstrated use of the 24 and 30 fps rates in the variable picture-dominance system to which this invention is related. This invention can transition into any standard or nonstandard frame rate, if such an operating mode enhances the film experience, in the judgment of the filmmakers producing the motion picture.

The examples given are illustrative and not limiting. Other embodiments are possible, and they should be considered as lying within the scope of the invention. The method disclosed can be easily modified to accommodate any speed change, whether presently contemplated or not.

The invention claimed is:

1. A method for preparing a finite length of motion picture film, during the projection of which the frame rate at which said film is projected increases or decreases as part of a series of events which accommodate a change from one projector frame rate to another during the showing of a single motion picture, comprising: the selection of a specific number of frames of said film for preparation, representing a specific time interval, over the course of which said frame rate change is fully accomplished; underexposure of selected frames to be projected during the period of transition from one frame rate to another, with the effect that the illusion of flicker is maintained during the period of transition from one frame rate to another; and recording the audio information to be reproduced during said transitional period, on a frame-by-frame basis, at frequencies commensurate with the speed at which each particular frame is projected, with the effect that audience members hearing such audio information will not notice said speed change.

2. The method as in claim 1, in which the length of the transitional period is sixty frames.

3. The method as in claim 2, in which the maximum amount of underexposure is one half of one f-stop.

4. The method as in claim 1, in which the frames to be underexposed are evenly spaced along said film, separated by frames of film that are fully exposed.

5. The method as in claim 4, in which every other frame is underexposed.

6. The method as in claim 1, in which the amount of underexposure for each underexposed frame increases or decreases at a constant rate from each underexposed frame to the next.

7. The method as in claim 6, in which the amount of underexposure increases as frame rate increases and decreases as frame rate decreases.

8. The method in claim 6, in which the amount of underexposure increases or decreases from one underexposed frame to the next by a fraction in which the numerator is the numerator of the fractional expression representing the number of f-stops constituting the maximum amount of underexposure to be administered; and the denominator is the product of the denominator of the fractional expression representing the number of f-stops constituting the maximum amount of underexposure to be administered, and the number of frames during said transitional period that are underexposed.

9. The method as in claim 8, in which the maximum amount of underexposure occurs in the penultimate frame and the minimum amount of underexposure occurs in the first frame of the transition from a slower frame rate to a faster frame rate.

10. The method as in claim 8, in which the maximum amount of underexposure occurs in the first frame and the minimum amount of underexposure occurs in the penultimate frame of the transition from a faster frame rate to a slower frame rate.

11. The method as in claim 1, in which audio information recorded in the digital mode is transferred to the film to be projected during said transitional period on a frame-by-frame basis, the frequencies at which said audio information is to be reproduced having been altered for reproduction at the speed at which said frame is traveling at the moment when it passes through the projector.

12. The method as in claim 1, further comprising a means for operating a film projector at two or more different speeds.

13. The method as in claim 12, in which said means comprises a variable frequency power supply capable of providing alternating current at two or more reference frequencies and an AC synchronous motor which accepts such power and actuates the movement of the film to be shown through said projector.

14. The method as in claim 13, in which said projector is operated at the rate of twenty-four frames per second through the provision of alternating current at the frequency of sixty Hertz and thirty frames per second through the provision of alternating current at the frequency of seventy-five Hertz.

15. The method as in claim 14, in which the transition from 24 to 30 frames per second is accomplished over the length of 60 frames of film by underexposing the first frame by one sixtieth of one f-stop and subsequently increasing the magnitude of the underexposure of each odd-numbered frame by one sixtieth of one f-stop, concluding with the fifty-ninth frame photographed underexposed by one half of one f-stop.

16. The method as in claim 15, in which the transition from 30 to 24 frames per second is accomplished over the length of 60 frames of film by underexposing the first frame by one half of one f-stop and subsequently decreasing the magnitude of the underexposure of each off-numbered frame by one sixtieth of one f-stop, concluding with the fifty-ninth frame photographed by one sixtieth of one f-stop.

17. The method as in claim 1, further comprising increasing screen brightness from conventional levels to a level which allows a greater visual impact to be observed by the viewers of said motion picture, for projection only of the frames that are shown at the higher frame rate.

18. The method as in claim 17, in which said increased screen brightness is twenty foot-lamberts or more.

19. A method for achieving a transition from one projector frame rate to another during the showing of a motion picture, where the improvement consists of sequentially and variably altering the amount of underexposure of selected evenly-spaced frames of film to produce the illusion of flicker during said frame rate transition.

* * * * *